(12) United States Patent
Suzuki

(10) Patent No.: US 9,235,718 B2
(45) Date of Patent: Jan. 12, 2016

(54) PRINTING APPARATUS AND PRINTING SYSTEM

(75) Inventor: Masataka Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 209 days.

(21) Appl. No.: 13/454,613

(22) Filed: Apr. 24, 2012

(65) Prior Publication Data

US 2013/0021639 A1    Jan. 24, 2013

(30) Foreign Application Priority Data

Jul. 22, 2011    (JP) ................................. 2011-160450

(51) Int. Cl.
| G06K 15/00 | (2006.01) |
| G06F 21/60 | (2013.01) |
| G06F 21/42 | (2013.01) |

(52) U.S. Cl.
CPC .............. *G06F 21/608* (2013.01); *G06F 21/42* (2013.01); *G06F 2221/2111* (2013.01); *G06F 2221/2153* (2013.01)

(58) Field of Classification Search
USPC ......................................................... 705/67
See application file for complete search history.

(56) References Cited

U.S. PATENT DOCUMENTS

| 2003/0048484 | A1 | 3/2003 | Seki et al. | |
| 2006/0112021 | A1* | 5/2006 | Maki ................................ | 705/67 |
| 2007/0046992 | A1 | 3/2007 | Matsuda et al. | |
| 2008/0030773 | A1 | 2/2008 | Lee | |
| 2008/0195545 | A1* | 8/2008 | Motoyama ...................... | 705/51 |
| 2009/0055924 | A1 | 2/2009 | Trotter | |
| 2011/0138483 | A1* | 6/2011 | Bravo et al. ..................... | 726/29 |

FOREIGN PATENT DOCUMENTS

| CN | 1924792 A | 3/2007 |
| CN | 101117062 A | 2/2008 |

(Continued)

OTHER PUBLICATIONS

Bohon, Cory, "Locksmith Password Generator", Sep. 20, 2010, retrieved from the Internet: URL:https://itunes.apple.com/us/app/locksmith-password-generator/id390075952?mt=8, retrieved on Jan. 17, 2013.

(Continued)

*Primary Examiner* — Marivelisse Santiago Cordero
*Assistant Examiner* — Neil R McLean
(74) *Attorney, Agent, or Firm* — Scully, Scott, Murphy & Presser, PC

(57) ABSTRACT

There is provided a printing apparatus including: a storage section configured to store printing data; an accepting section configured to accept an issuance instruction to issue a password corresponding to the printing data; a password generating section configured to generate a password; an obtaining section configured to obtain a destination corresponding to the printing data; a transmission section configured to transmit the generated password to the destination, on condition that the accepting section accepts the issuance instruction; an input section configured to accept an input of a password by a user; a judgment section configured to judge as to whether or not a password accepted by the input section is coincident with the transmitted password; and a printing section configured to start printing in a case that the judgment section judges that the accepted password is coincident with the transmitted password.

13 Claims, 10 Drawing Sheets

(56) References Cited

FOREIGN PATENT DOCUMENTS

| | | |
|---|---|---|
| JP | 2003-084945 | 3/2003 |
| JP | 2005-309566 A | 11/2005 |
| JP | 2006-164157 | 6/2006 |
| JP | 2007-160889 | 6/2007 |
| JP | 2007-196481 | 8/2007 |
| JP | 2008-087487 A | 4/2008 |
| JP | 2008-225999 A | 9/2008 |

OTHER PUBLICATIONS

Partial European Search Report dated Jan. 30, 2013 from related application EP 12165455.2.

Extended Partial European Search Report dated Feb. 27, 2014 from related European Application No. 12 16 5455.2.

Official Action dated May 12, 2014 received from the Chinese Patent Office in related CN application 201210209996.8 together with English language translation.

\* cited by examiner

Fig. 4

| USER ID | FIRST DESTINATION | SECOND DESTINATION | HIGH SECURITY TRANSMMISION |
|---|---|---|---|
| 0001 | xxx1@yy.com | xyz1@yy.com | ○ |
| | xxx2@yy.com | | ○ |
| | xxx3@zz.com | | × |
| | xxx4@zz.com | | × |
| 0002 | xx1x@yy.com | xyz2@yy.com | ○ |
| | xx2x@yy.com | | × |
| 0003 | x1xx@yy.com | | ○ |
| 0004 | xx4x@yy.com | | × |
| | xx5x@yy.com | | × |

Fig. 5

| ISSUANCE CONDITION | CONTENT | SETTING |
|---|---|---|
| ISSUANCE AREA | WITHIN 5m | VALID |
| | IN FIRST PLANT | INVALID |
| | IN SECOND PLANT | INVALID |
| ISSUANCE TIME PERIOD | AM 9:00~12:00 | VALID |
| | PM 1:00~6:00 | VALID |
| | PM 6:00~9:00 | INVALID |

| USER ID | NOTICE DESTINATION |
|---|---|
| 0001 | 100.0.0.1 |
| 0002 | 100.0.0.2 |
| 0003 | 100.0.0.3 |
| 0004 | 100.0.0.10 |

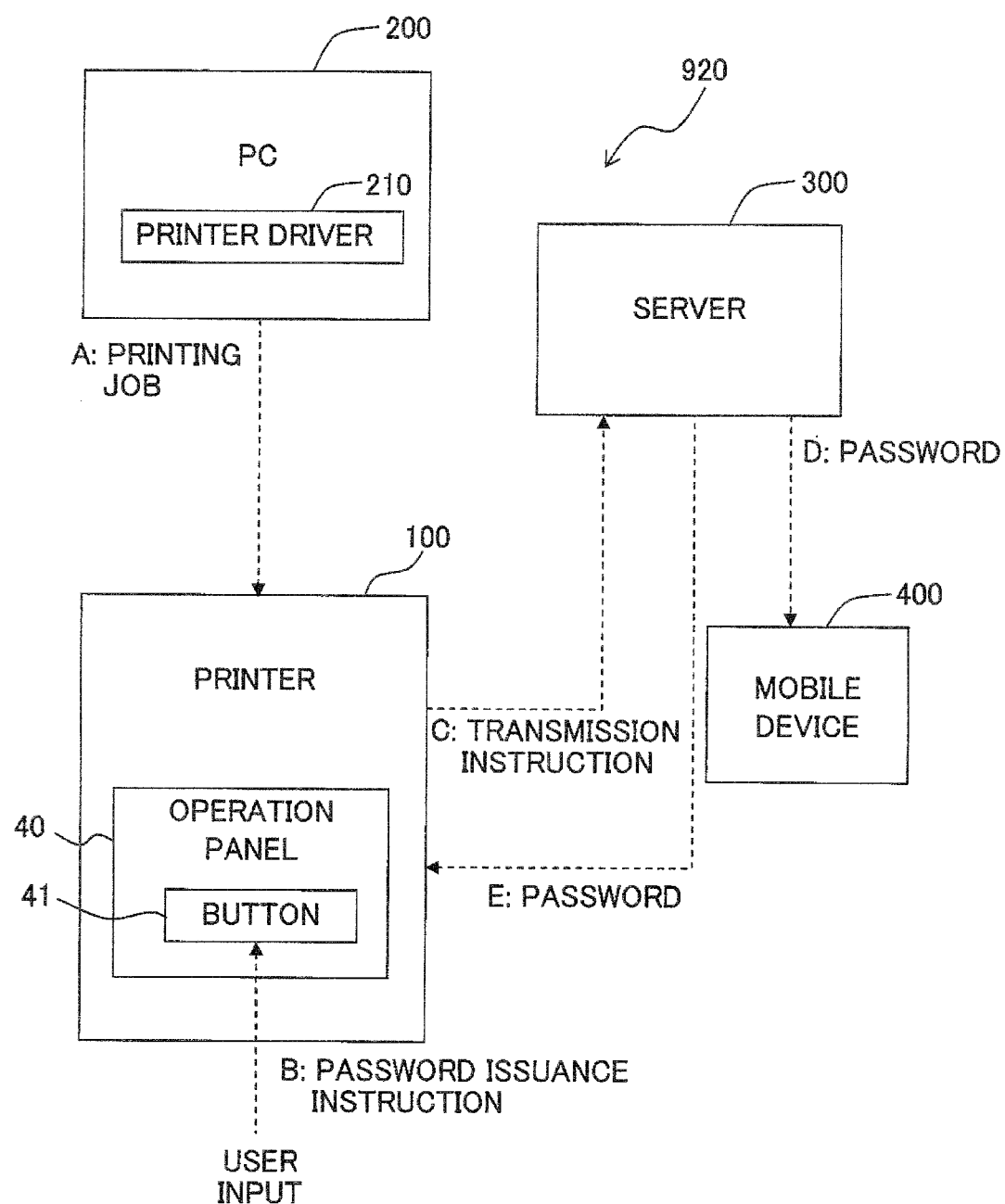

PRINTING APPARATUS AND PRINTING SYSTEM

CROSS REFERENCE TO RELATED APPLICATION

The present application claims priority from Japanese Patent Application No. 2011-160450, filed on Jul. 22, 2011, the disclosure of which is incorporated herein by reference in its entirety.

BACKGROUND OF THE INVENTION

1. Field of the Invention

The present invention relates to a printing apparatus and a printing system and in particular, to a printing apparatus and a printing system which stores printing data in the printing apparatus and performs printing of the printing data when an input by a user is accepted.

2. Description of the Related Art

There has been conventionally known a remote printing technique as follows. That is, printing data is transmitted to a printing apparatus from a terminal device such as a PC, a mobile phone, etc., and the printing apparatus stores the printing data to come into a standby state. Then, printing is started when a user carries out a printing instruction of the printing data to the printing apparatus. In the recent years, the remote printing technique as described above is widely used with the popularization of public wireless LAN service. For example, the printing data is transmitted, in advance, to the printing apparatus of a public facility such as a railroad station, an airport, etc., and thereby making it possible for the user to obtain a printed matter of the printing job there.

In the remote printing technique as described above, there is fear that the printing apparatus is operated by a third party. Thus, a problem arises such that confidentiality is lowered. In view of this, for example, Japanese Patent Application Laid-open No. 2007-196481 discloses that the printing apparatus which receives the printing data generates a password, that the password is notified to a source device or an originating device of the printing data, and that the printing of the printing data which corresponds to the password is started when the password inputted by the user is verified or authenticated.

SUMMARY OF THE INVENTION

However, the conventional remote printing technique described above has the following problem. That is, in the technique described above, it takes time, in some cases, after the user confirms the password in the originating device of the printing data until the user moves to the printing apparatus to input the password. Therefore, there is a possibility that the password is leaked to the third party and there is scope to further improve the confidentiality.

The present teaching has been made in order to solve the problem on the conventional remote printing technique as described above, an object of which is to provide a printing apparatus and a printing system, each of which has a low possibility of a leak of a password to a third party.

According to the first aspect of the present teaching, there is provided a printing apparatus which performs printing on a medium based on a piece of printing data, the apparatus including:

a storage section configured to store printing data;

an accepting section configured to accept an issuance instruction to issue a password corresponding to the printing data;

a password generating section configured to generate a password;

an obtaining section configured to obtain a destination corresponding to the printing data;

a transmission section configured to transmit the password generated by the password generating section to the destination obtained by the obtaining section, on condition that the accepting section accepts the issuance instruction;

an input section configured to accept an input of a password by a user;

a judgment section configured to judge as to whether or not a password accepted by the input section is coincident with a transmitted password transmitted by the transmission section; and a printing section configured to start printing based on the printing data corresponding to the transmitted password, in a case that the judgment section judges that the password accepted by the input section is coincident with the transmitted password. The printing apparatus according to the present teaching may further include an operation section through which an input operation by the user is accepted, and the accepting section may accept the issuance instruction by the input operation to the operation section.

The printing apparatus according to the present teaching stores the printing data in the storage section. For example, when the issuance instruction of the password of the printing data is accepted by an input operation to an operation section, the printing apparatus generates the password of the printing data. Then, the printing apparatus of the present teaching transmits the generated password to the destination corresponding to the printing data. After transmitting the password, the printing apparatus of the present teaching accepts the input of the password by the user. In the case that the inputted password is coincident with the transmitted password, the printing of the printing data corresponding to the password is started.

That is, in the printing apparatus of the present teaching, the password of the printing data is transmitted to the destination (for example, a mobile device carried by the user of the printing data) corresponding to the printing data, on the condition that the issuance instruction of the password is accepted by, for example, the operation of the operation section by the user. In this configuration, in a case that the issuance instruction is performed in a state that the user carries the destination device, the user receives the password in the vicinity of the printing apparatus. Accordingly, it can be expected to shorten a time after the password is obtained by the user and before the password is inputted by the user. Thus, it can be expected to reduce the possibility of the leak of the password to a third party.

According to the second aspect of the present teaching, there is provided a printing system which performs printing on a medium based on printing data, the system including:

a printing apparatus which includes:

a storage section configured to store printing data;

an operation section configured to accept an input operation by a user; and an accepting section configured to accept an issuance instruction to issue a password corresponding to the printing data by the input operation to the operation section of the printing apparatus;

a password generating section configured to generate a password;

an obtaining section configured to obtain a destination corresponding to the printing data; and a transmission section configured to transmit the password generated by the password generating section to the destination obtained by the obtaining section, on condition that the accepting section of the printing apparatus accepts the issuance instruction;

wherein the printing apparatus performs the printing on condition that the password corresponding to the printing data is coincident with a password inputted by the user.

According to the third aspect of the present teaching, there is provided a printing apparatus which performs printing on a medium based on printing data, including:

an image forming section configured to form an image on the medium based on printing data;

a storage section configured to store the printing data;

an interface section configured to communicate with an external device;

an operation section configured to accept an instruction input by a user;

a controller configured to control the image forming section, the storage section, the interface section and the operation section, and configured to:

accept an issuance instruction to issue a password corresponding to the print data via the operation section;

obtain information of an external device as a destination for transmitting the password corresponding to the printing data;

generate a password;

transmit the generated password to the external device obtained as the destination for transmitting the password, on condition that the controller accepts the issuance instruction via the operation section;

accept an input of a password by a user via the operation section;

judge whether or not the password accepted via the operation section is coincident with the transmitted password transmitted to the external device as the destination for transmitting the password; and start printing based on the printing data corresponding to the transmitted password, in a case that the controller judges that the password accepted by the operation section is coincident with the transmitted password.

According to the present teaching, it can be realized a printing apparatus and a printing system, each of which has a low possibility of a leak of a password to a third party.

BRIEF DESCRIPTION OF THE DRAWINGS

FIG. 4 is a diagram showing an example of registration of a database in which destination information is stored.

FIG. 5 is a diagram showing an example of registration of a database in which an issuance condition is stored.

FIG. 11 is a block diagram schematically showing operation of a printing system according to the fourth embodiment.

DESCRIPTION OF THE PREFERRED EMBODIMENTS

An explanation will be made in detail with reference to the accompanying drawings about embodiments in which a printing apparatus according to the present teaching is embodied. In this embodiment, the present teaching is applied to a printer connected to a personal computer (PC).

[Structure of Printer]

Figure 1:
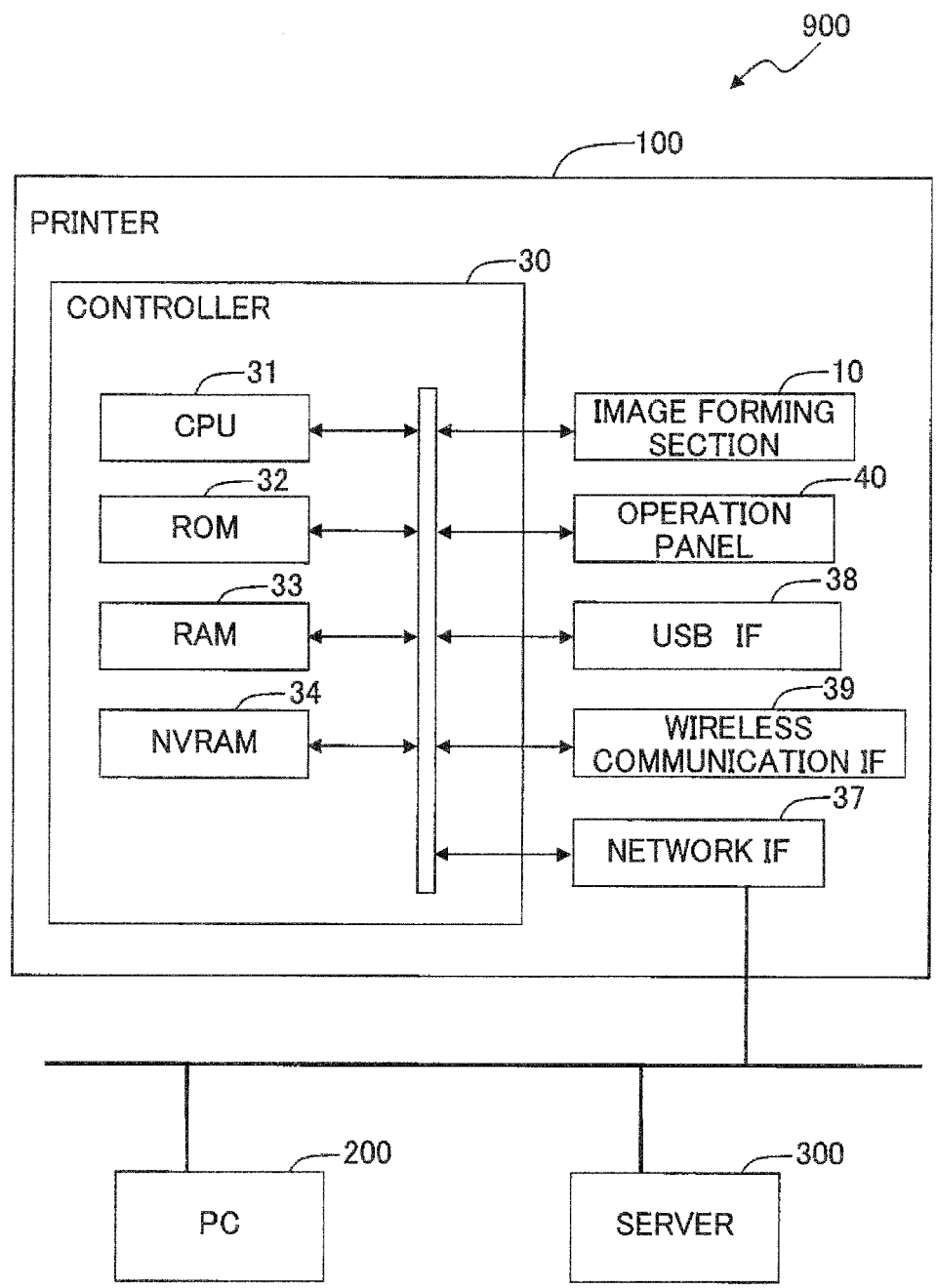
FIG. 1 is a block diagram showing an electrical structure of a printer according to an embodiment.

As shown in FIG. 1, a printer 100 (an example of a printing apparatus) according to this embodiment includes a controller 30 provided with a CPU 31, a ROM 32, a RAM 33, and a NVRAM (non-volatile RAM) 34. Further, the controller 30 is electrically connected to an image forming section 10 which prints an image on a paper sheet, an operation panel 40 on which an operation state is displayed and through which an input operation by a user is accepted, a network interface 37, a USB interface 38, and a wireless communication interface 39. Noted that it is not indispensable to electrically connect the controller 30 to the components described above, provided that the controller 30 is connected to communicate with these components.

The ROM 32 stores firmware which is a control program for controlling the printer 100, various settings, an initial value, etc. The RAM 33 and the NVRAM 34 (examples of a storage section) are utilized as a work area at which the various control programs are loaded or as a storage area which temporarily stores printing data.

The CPU 31 (an example of an accepting section, a generating section, an obtaining section, a transmission section, a judgment section, a confidentiality judgment section, a position judgment section, a first transmission prohibition section, a determining section, a second transmission prohibition section, a time judgment section, a first print prohibition section, a notifying section, an instruction accepting section, a second print prohibition section, an expansion section, and a prohibition section) controls each component of the printer 100, while storing, in the RAM 33 or the NVRAM 34, a processing result processed in accordance with the control program read from the ROM 32 and/or a signal from each of the sensors.

The network interface 37, the USB interface 38, and the wireless communication interface 39 are interfaces which make it possible to communicate the printer with any other device. The printer 100 receives the printing data transmitted from any other device via these interfaces.

In this embodiment, the printer 100 can communicate with a personal computer (PC) 200 and a server 300 via the network interface 37. In addition to that, any other device can be used via the USB interface 38. For example, in a case that a flash memory is installed to the USB interface 38, the flash memory can be used as a storage area.

The image forming section 10 (an example of a printing section) may be either the electro photography system or the ink-jet system, provided that the image can be printed on the paper sheet. Further, the image forming section 10 may form either a color image or a monochrome (black and white) only.

The operation panel 40 (an example of an operation section, an input section) includes various buttons through which the input operation by the user is accepted and a touch panel display on which character information, buttons, etc., are displayed. The various buttons include, for example, an OK button through which the user carries out instruction to start the printing operation and a cancel button through which the user carries out instruction to cancel the printing operation.

First Embodiment

[Structure of Printing System]

Subsequently, an explanation will be made with reference to FIG. 2 about the structure and operation of a printing system 900 which includes the printer 100.

In the printing system 900, when the PC 200 accepts the printing instruction from the user, a printer driver 210 installed into the PC 200 creates a printing job. Then, the printing job is transmitted to the printer 100 from the PC 200 (see "A: printing job" of FIG. 2).

The printing job includes, in addition to the printing data as the print objective, information to identify the printing job, information to identify the user who enters the printing job, security information, and password information. The password information includes, for example, a term of validity of the password. The password information may be set by the input operation of the user or may be set by the printer driver 210 automatically. As the information included in the printing job, the password information is not necessarily indispensable. For example, in a case that the term of validity of the password is not included in the printing job, the printer 100 determines the term of validity of the password.

In a case that the printing job is entered into the printer 100, the printing job is stored in a memory area (memory region), of the printer 100, reserved for storing the printing job. The memory area is configured to include the RAM 33 and/or the NVRAM 34. In a case that an external memory 340, such as a USB memory or an external hard disk drive (HDD), is connected to the printer 100, a memory area reserved for the external memory may be included in the memory area 110 of the printer 100.

After the printing job is stored in the memory area of the printer 100, the printer 100 comes into a standby state to wait for an issuance instruction of the password for the printing job. That is, the printer 100 does not start the printing of the printing job at a stage when the printer 100 received the printing job.

In this embodiment, in a case that the user operates the operation panel 40 to select the printing job of the password issuance objective, the printer 100 displays, on the touch panel display of the operation panel 40, a password issuance button 41 to issue the password. When the user presses the password issuance button 41, the issuance instruction of the password for the selected printing job is inputted into the printer 100 (see "B: password issuance instruction" of FIG. 2).

Figure 2:
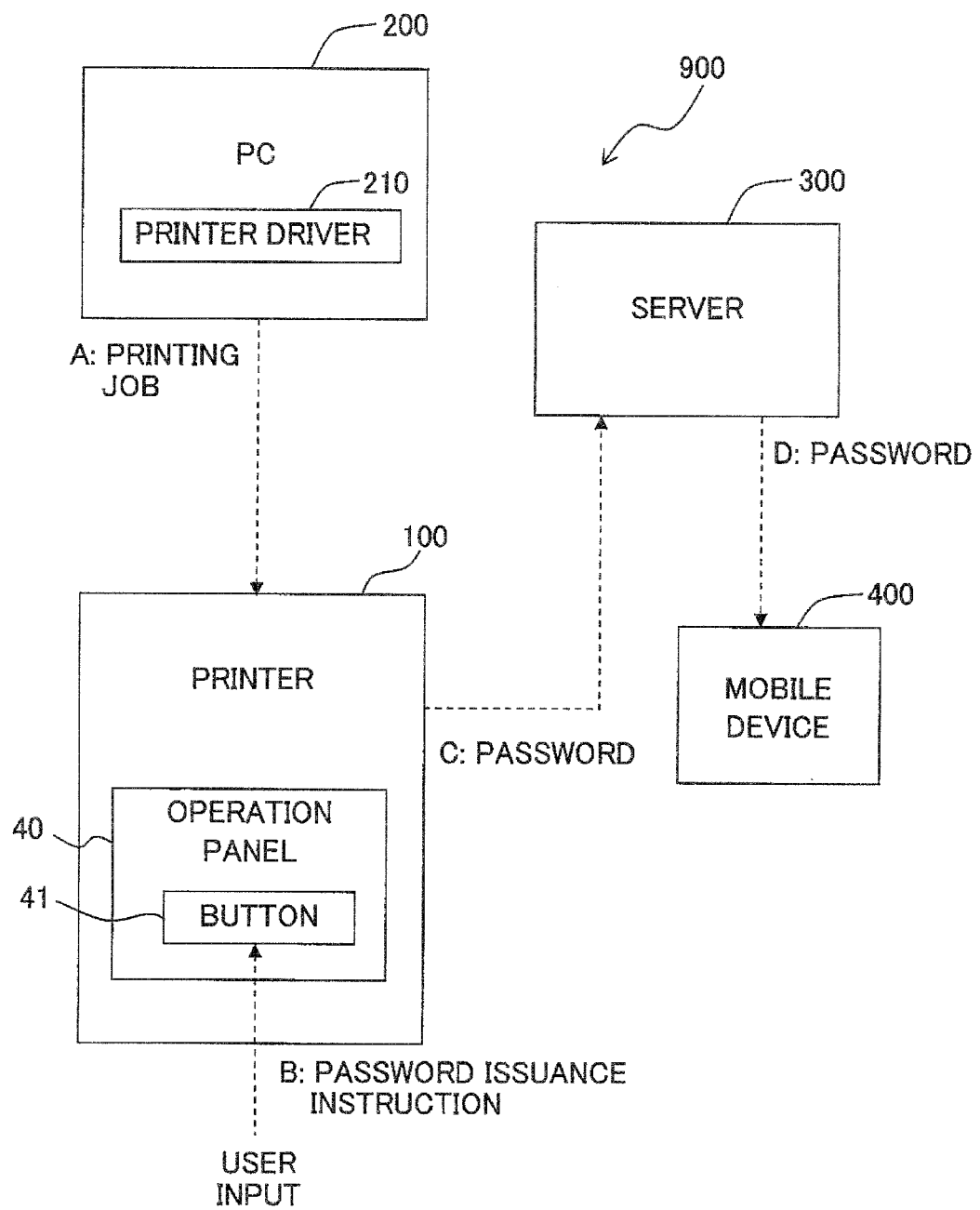
FIG. 2 is a block diagram schematically showing operation of a printing system according to the first embodiment.

When the printer 100 accepts that the password issuance button 41 is pressed, the printer 100 generates the password for the printing job to transmit the password to a mobile device 400 (see "C: password" and "D: password" of FIG. 2). In this embodiment, the server 300 functions as a mail server, and an e-mail send from the printer 100 is transmitted to the mobile device 400 via the server 300. That is, the printer 100 transmits the password for the printing job to a device which is different from the PC 200 from which the printing job was entered. The destination of the password for each user is registered in the printer 100 in advance, and is determined in accordance with the user of the printing job.

That is, after the user entered the printing job into the printer 100, the user moves to a place at which the printer 100 is provided. In this situation, the user carries a device (for example, the mobile device 400) by which the password issued by the printer 100 is received. Then, the user operates the operation panel 40 of the printer 100 to select a desired printing job, and presses the password issuance button 41. The mobile device 400 carried by the user receives the password issued by the printer 100, and the password is confirmed by the user. The mobile device 400 can receive the password by using, for example, the e-mail, infrared ray communication, Bluetooth, etc. After confirming the password, the user inputs the password received by the mobile device 400 into the printer 100.

In a password obtaining procedure described above, not only the third party but also the user who entered the printing job can not know the password corresponding to the printing job, until the mobile device 400 receives the password. Further, the password is generated by the printer 100, and then is transmitted to the mobile device 400 carried by the user. Thus, no one can know the password through the PC 200 when the user who entered the printing job is away from the PC 200. Therefore, the password is less likely to be leaked and is highly safe and secure.

After transmitting the password, the printer 100 accepts the input of the password. After the user inputs the password, the printer 100 checks the password inputted by the user against the password transmitted to the mobile device 400. The printing of the printing job corresponding to the password is started on the condition that the password inputted by the user is coincident with the password transmitted to the mobile device 400.

[Control of Printer]

Subsequently, an explanation will be made about the control of the printer 100 which realizes the operation of the above-described printing system 900. As described above, the operation of the printer 100 includes the operation to issue the password and the operation to start the printing of the printing data corresponding to the password after the issuance of the password. Hereinbelow, an explanation will be given while being focused on the above two operations.

[Password issuance Process]

At first, an explanation will be made with reference to a flowchart of FIG. 3 about a procedure of a password issuance process (an example of the password generating section, the obtaining section, the transmission section, the confidentiality judgment section, the position judgment section, the first transmission prohibition section, the determining section, and the second transmission prohibition section) which is the operation to issue the password. The password issuance process is executed by the CPU 31 when the password issuance button 41 displayed on the touch panel display of the operation panel 40 is pressed.

In the password issuance process, at first, the CPU 31 judges as to whether or not a security level of the printing job to be subjected to the password issuance is high (S101, an example of the confidentiality judgment section). In a case that the user enters the printing job from the PC 200, the user is capable of setting the security level of the printing job. Then, the security level set by the user is added to the printing job as the security information. In the process S101, the CPU 31 judges as to whether or not the security level is high.

Next, the CPU 31 obtains password destination information based on the security level. As shown in FIG. 4, the printer 100 has a destination database 341 in which e-mail addresses of respective users, each of which is the password destination, are stored. The CPU 31 obtains the destination information corresponding to the user of the printing job to be subjected to the password issuance.

In the destination database 341, at least one destination is stored for each user. In particular, user ID, the first destination, the second destination, and a transmission setting under a high security are stored as one record in the destination database 341. In the user ID, the information to identify the user is stored. In the first destination, the e-mail address as the destination of the password is stored. In a case that a plurality of destinations are stored in the first destination, the password is simultaneously transmitted to the plurality of destinations. Further, in the second destination, another e-mail address, to which the password is retransmitted in a case that the transmission to the first destination is unsuccessful, is stored. In a case that the second destination is not stored, even when the transmission to the first destination is unsuccessful, the password is not retransmitted. As to the transmission setting under the high security, a symbol "o" means that the password is transmitted even when the security level is high, and a symbol "x" means that the password is not transmitted when the security level is high.

In view of the above, in a case that the destination information is obtained and that the security level of the printing job is high (S101: YES), the CPU 31 extracts only the destination, in which the transmission setting under the high security is "o", from among the destinations corresponding to the user of the printing job (S102, an example of the obtaining section). On the other hand, in a case that the security level of the printing job is not high (S101: NO), the CPU 31 extracts all of the destinations corresponding to the user of the printing job, irrespective of the transmission setting under the high security (S111, an example of the obtaining section). That is, in the case that the security level of the printing job is high, the number of destinations is decreased and the confidentiality of the printing data is increased. On the other hand, in the case that the security level of the printing job is low, the number of destinations is increased to make it easy to receive the password. That is, reliability of start of the printing is enhanced.

After the CPU 31 obtains the destination information in the process S102 or the process S111, the CPU 31 judges as to whether or not an issuance condition to issue the password is satisfied (S103, an example of the position judgment section, the determining section). As shown in FIG. 5, the printer 100 has a condition database 342 in which various issuance conditions are stored. In the process S103, the CPU 31 judges as to whether or not the various issuance conditions in the condition database 342 are satisfied.

In particular, conditions in relation to an issuance area and an issuance time are stored in the condition database 342 of this embodiment shown in FIG. 5. The issuance area is a condition in relation to a position of the device as the destination. For example, a distance from the printer 100 and a specific location are set as the issuance area. For example, in a setting "within 5 m" as shown in FIG. 5, in a case that the destination device is located within 5 m from the printer 100, the condition is satisfied. In a case that the destination device is not located within 5 m from the printer 100, the condition is not satisfied. Information of the destination device is set by another database. The positions of the destination device and the printer 100 can be obtained by a publicly known position measurement technique, such as GPS. Further, even if the position of the device can not be obtained accurately, it is possible to know as to whether or not the destination device is located within a predetermined range from the printer 100 by using a publicly known wireless technique, such as Bluetooth, RFID, etc. By limiting the issuance area as described above, it is possible to avoid the transmission of the password in a case that the third party who does not have the destination device of the password presses the password issuance button 41.

Further, the issuance time is a condition in relation to a time at which the password issuance button 41 is pressed. A period of time in which the transmission of the password is permitted is set as the issuance time. In a case that the time at which the password issuance button 41 is pressed is within the period of time set as the issuance time, the condition is satisfied. In a case that the time at which the password issuance button 41 is pressed is not within the period of time set as the issuance time, the condition is not satisfied. By limiting the issuance time as described above, it is possible to avoid the transmission of the password in a case that the third party presses the password issuance button 41 during an unexpected period of time.

A plurality of conditions can be set in the issuance area and the issuance time, respectively. Further, a setting for validating the condition or a setting for invaliding the condition can be made for each of the conditions. The CPU 31 judges as to whether or not the condition is valid for each issuance area and each issuance time. As for the issuance area, the CPU judges that the condition of the issuance area is satisfied provided that at least one condition of the issuance area is satisfied. Also, as for the issuance time, the CPU judges that the condition of the issuance time is satisfied provided that at least one condition of the issuance time is satisfied.

In the condition database 342 of this embodiment, the condition for permitting the password issuance is stored. However, it is allowable to store the condition for prohibiting the password issuance. That is, the condition, by which the CPU 31 can judge as to whether or not the password issuance is permitted, may be stored in the condition database 342.

In a case that at least one issuance condition of the issuance area and the issuance time is not satisfied (S103: NO), the CPU 31 reports to the user that the at least one issuance condition is not satisfied (S121). Then, the password issuance process is completed without issuing the password (an example of the first transmission prohibition section, the second transmission prohibition section). The report process in the process S121 includes, for example, that a text message is displayed on the touch panel display of the operation panel 40.

In a case that both of the issuance conditions of the issuance area and the issuance time are satisfied (S103: YES), the CPU 31 generates the password (S104, an example of the password generating section). The password is issued for each password issuance instruction. The issued password is valid only for the printing job to be subjected to the password issuance. The password is generated by combining a plurality of numbers and/or symbols which are selected by a random sampling by the printer 100. After the password is generated, the password is correlated with the printing job and is stored by the CPU 31 (S105).

Thereafter, the CPU 31 transmits the password generated in the process S104 to the destination obtained in the process S102 or the process S111 (S106, an example of the transmission section). In particular, the CPU 31 transmits text information in which the password is described via the e-mail to the first destination(s) obtained in the process S102 or the process S111.

After the process S106, the CPU judges as to whether or not the e-mail transmission is successful (S107). Whether or not the e-mail transmission is successful can be judged, for example, based on a response from the mail server. Further, in a case that the destination device has a function to provide a response indicating that the e-mail was opened, whether or not the e-mail transmission is successful can also be judged based on presence or absence of the response.

In a case that the e-mail transmission is unsuccessful (S107: NO), the CPU 31 judges as to whether or not, in addition to the destination to which the e-mail was unsuccessfully transmitted, another destination to which the e-mail is retransmitted is set (S131). In particular, the CPU 31 judges as to whether or not the second destination, which is alternative to the destination to which the e-mail was unsuccessfully transmitted, is set. In a case that the destination to which the e-mail is retransmitted is set (S131: YES), the password is transmitted to the second destination (S141). After the process S141, the process is shifted to the process S107 and the CPU 31 judges as to whether or not the retransmission is successful.

In a case that the destination to which the e-mail is retransmitted is not set (S131: No), the CPU 31 reports to the user that the transmission of the password is unsuccessful (S132). Then, the password issuance process is completed without starting the printing. In this embodiment, the third destination, to which the e-mail is retransmitted in a case that the transmission to the second destination is unsuccessful, is not set. Therefore, in the case that the transmission to the second destination in the process S141 is unsuccessful, it is judged that still another destination to which the e-mail is retransmitted is not set.

On the other hand, in a case that the e-mail transmission is successful (S107: YES), a print accepting process to start the printing of the printing job is started by the CPU 31 (S108). After the process S108, the password issuance process is completed by the CPU 31.

[Print Accepting Process]

Figure 6:
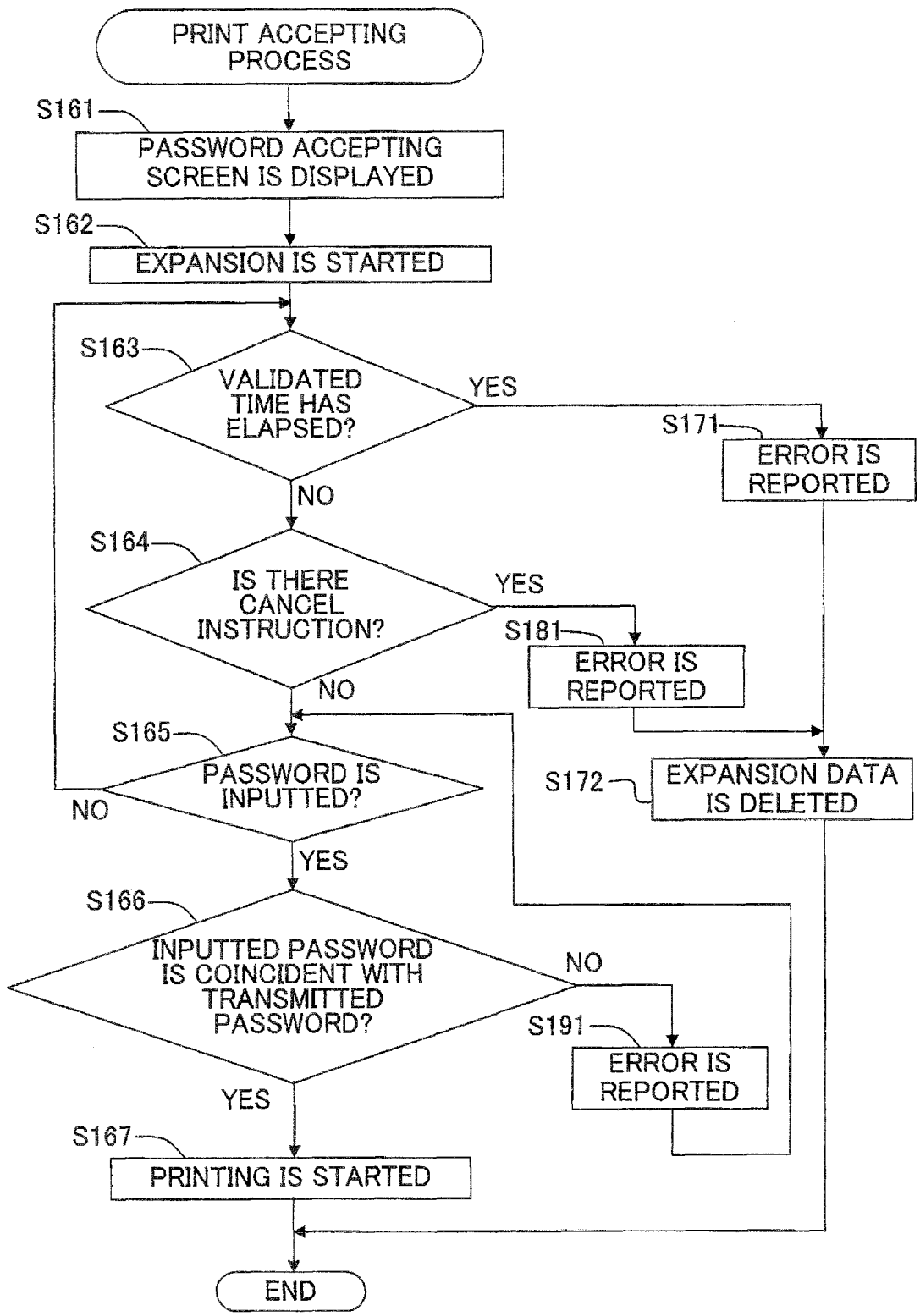
FIG. 6 is a flowchart showing a procedure of a print accepting process according to the first embodiment.

Subsequently, a procedure of a print accepting process (an example of the input section, the judgment section, the printing section, the time judgment section, the first print prohibition section, and the expansion section) to start the printing of the printing job will be explained with reference to a flowchart of FIG. 6. The print accepting process is executed by the CPU 31 when the issuance of the password is successful in the password issuance process.

In the print accepting process, at first, the CPU 31 displays, on the touch panel display of the operation panel 40, an accepting screen to accept the input of the password (S161). Then, expansion of the printing data included in the printing job into bitmap image data is started so that the printing can be started immediately after the input of the password (S162, an example of the expansion section). Note that the process S162 may be executed before the process S161 is executed. Alternatively, the process S162 may be executed immediately after the password is transmitted (immediately after the process S106) in the password issuance process. That is, the start of the printing may be accelerated by starting the expansion of the printing data prior to the start of the printing of the process S167 (as will be described later on) on condition of the transmission of the password.

Next, the CPU 31 judges as to whether or not a validated time of the password issued in the process S106 has elapsed, that is, as to whether or not an elapsed time after the password is transmitted exceeds the validated time of the password (S163, an example of the time judgment section). In a case that the validated time of the password is set in the printing job, said validated time is used. On the other hand, in a case that the validated time of the password is not set in the printing job, a validated time which is set in the printer 100 is used.

In a case that the validated time of the password has elapsed (S163: YES), the CPU 31 reports to the user that the validated time of the password has elapsed (S171). Then, the CPU 31 deletes the expansion data (S172), and the print accepting process is completed (an example of the first print prohibition section) without staring the printing.

In a case that the validated time of the password does not elapse (S163: NO), the CPU 31 judges as to whether or not a cancel instruction is made (S164). The cancel instruction corresponds to that the cancel button provided on the operation panel 40 is pressed. In a case that the cancel instruction is made (S164: YES), the CPU 31 reports to the user that the cancel instruction is accepted (S181). Then, the CPU 31 deletes the expansion data (S172), and the print accepting process is completed without staring the printing.

In a case that the cancel instruction is not made (S164: NO), the CPU 31 judges as to whether or not the password is inputted by the user (S165, an example of the input section). In a case that the password is not inputted by the user (S165: NO), the process is shifted to the process S163 and the CPU 31 again judges as to whether or not the validated time of the password has elapsed.

On the other hand, in a case that the password is inputted (S165: YES), the CPU 31 judges as to whether or not the inputted password is coincident with the transmitted password (S166, an example of the judgment section). In a case that the inputted password is not coincident with the transmitted password (S166: NO), the CPU 31 reports to the user that the password was erroneously inputted (S191). The process is shifted to the process S165 and the re-input of the password is encouraged.

In a case that the inputted password is coincident with the transmitted password (S166: YES), the CPU 31 starts the printing of the printing data of the printing job corresponding to the password (S167, an example of the printing section). After the process S167, the print accepting process is completed by the CPU 31.

As described above, in the printing system 900 of the first embodiment, the password corresponding to the selected printing job is transmitted to the destination corresponding to the user of the printing job (for example, the mobile device 400), on the condition that the user presses the password issuance button 41 of the printer 100. That is, the password is not issued during a time after the user is away from the PC 200 and before the user arrives at the printer 100. The password is issued in a state that the user is likely to be present in front of the printer 100. Accordingly, it can be expected that a time after the password is obtained by the user and before the password is inputted by the user is shortened. Thus, the printing system 900 of the first embodiment has a low possibility of the leak of the password to the third party.

Further, in the printing system 900 of the first embodiment, even if the third party presses the password issuance button 41, the third party is less likely to obtain the password. This is because the password is transmitted to the preset destination. Thus, the confidentiality of the printing data is high.

Second Embodiment

[Password Issuance Process]

Figure 7A:
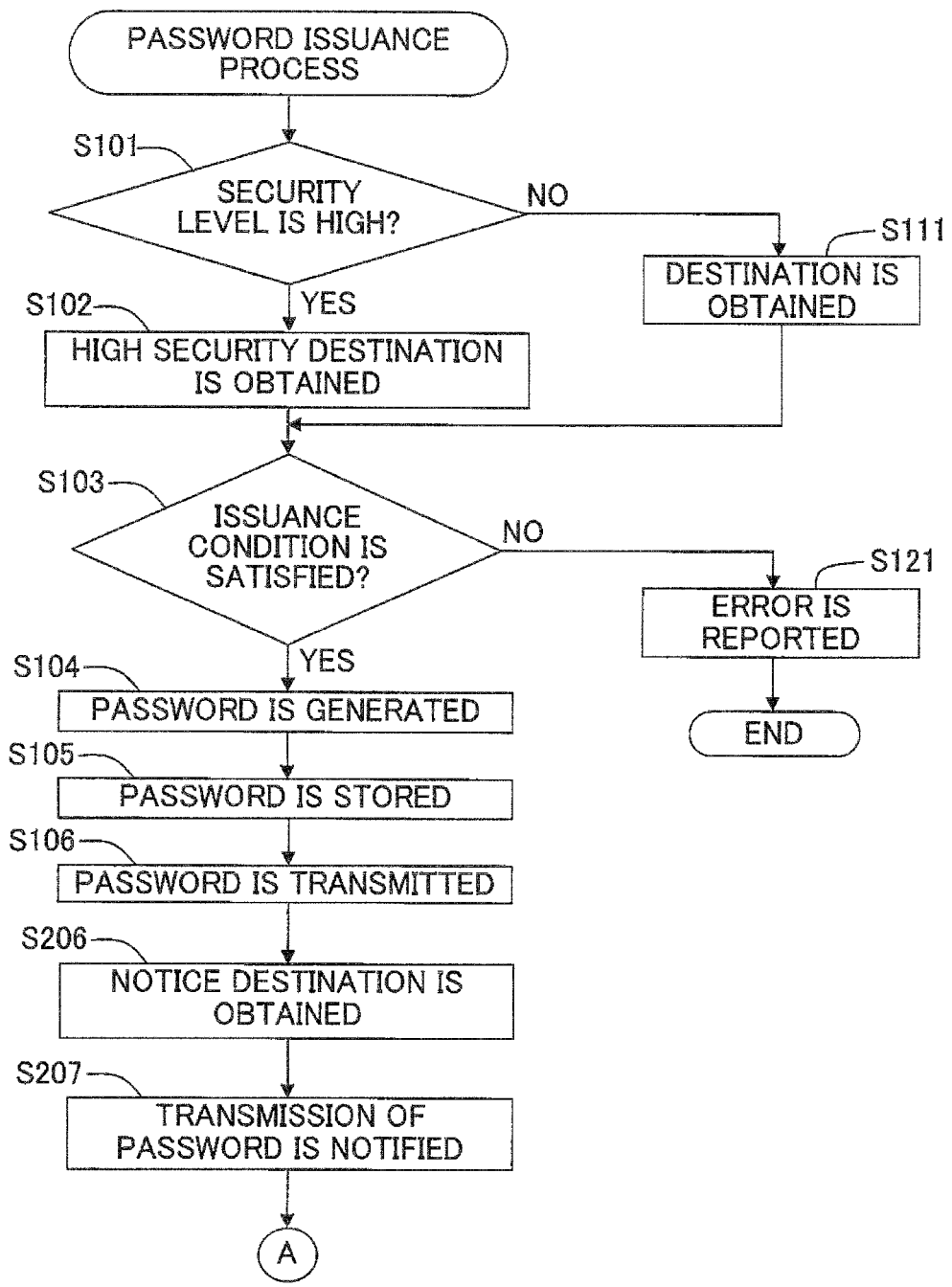
FIGS. 7A and 7B are flowcharts showing a procedure of the password issuance process according to the second embodiment.
Figure 7B:
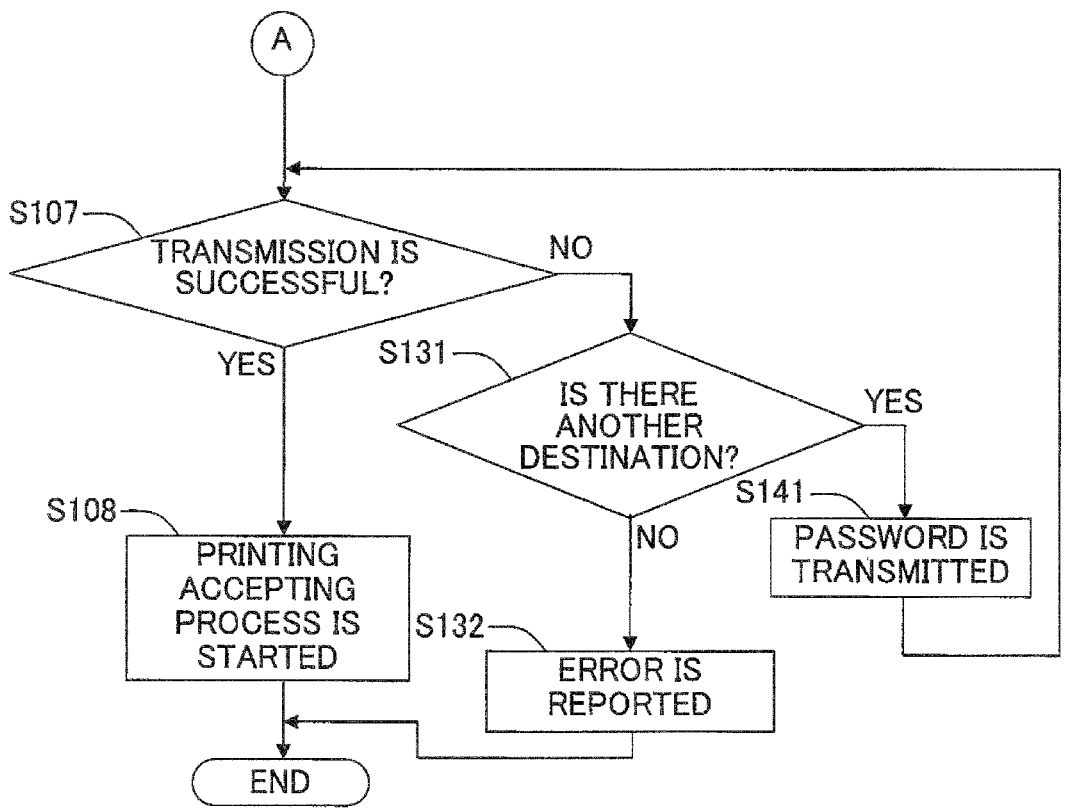

Subsequently, an explanation will be made with reference to flowcharts of FIGS. 7A and 7B about another embodiment of the password issuance process. In the password issuance process of the second embodiment, in a case that the password is issued, the fact of the password issuance is notified to the device from which the printing job was entered. In the following description, the processes, which are the same as or equivalent to those of the first embodiment, are designated by the same reference numerals, any explanation of which will be omitted as appropriate.

Figures 8, 9:
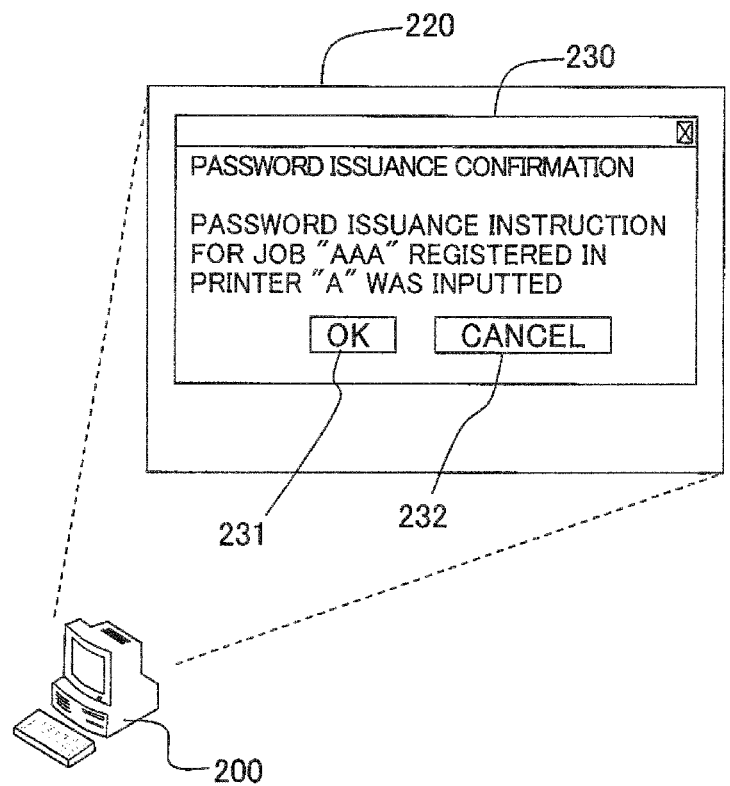
FIG. 8 is a diagram showing an example of registration of a database in which notice destination information is stored.
FIG. 9 is a diagram showing an example of a screen of a PC when a password issuance notice is received.

The processes S101 to S106 (namely, to the password transmission process) of the password issuance process of the second embodiment are the same as those of the password issuance process of the first embodiment. After the process S106, the CPU 31 obtains a notice destination which corresponds to the user of the selected printing job (S206). As shown in FIG. 8, the printer 100 has a notice destination database 343 in which IP addresses of respective users, each of which is the notice destination, are stored. The CPU 31 is capable of obtaining notice destination information corresponding to the user of the printing job to be subjected to the password issuance.

Next, the CPU 31 notifies, to the notice destination obtained in the process S206, that the password is transmitted (S207, an example of the notifying section). This notice is referred to as a "password issuance notice". With the password issuance notice, the fact of the password issuance is notified to the device from which the printing job was entered. After the CPU 31 sends the password issuance notice in the process S207, the process is shifted to the process S107. The processes subsequent to the process S107 are the same as those of the first embodiment.

As shown in FIG. 9, in the device from which the printing job was entered and by which the password issuance notice is received (hereinafter it is assumed that the password issuance notice is received by the PC 200), a message box 230 in which a message to confirm the issuance of the password is described is displayed on a display 220 of the PC 200. The massage box 230 is displayed, for example, by a resident program incorporated in the PC 200.

In addition to the massage, an OK button 231 and a cancel button 232 are displayed on the message box 230. In a case that the user presses the OK button 231, the PC 200 closes the message box 230. On the other hand, the user presses the cancel button 232, the PC 200 closes the message box 230 and transmits a cancel instruction to cancel the printing to the printer 100. It is noted that the content displayed on the message box 230 is merely an example, and the present teaching is not limited thereto.

The printer 100 cancels the printing operation when the printer 100 accepts the cancel instruction from the PC 200 (an example of the instruction accepting section, the second print prohibition section). Further, in a case that the printing operation is not yet started by the printer 100, the CPU 31 accepts the cancel instruction in the process S164 (an example of the instruction accepting section) during the print accepting process (see FIG. 6). Then, it is reported that the cancel instruction was accepted in the print accepting process (S181), the expansion data is deleted (S172), and the print accepting process is completed (an example of the second print prohibition section) without starting the printing operation.

As described above, the printing system of the second embodiment notifies the transmission of the password to the device from which the printing job was entered. By doing so, even if the password issuance instruction is made by the third party, the user having the printing data is more likely to know that. Further, in a case that the user having the printing data accepts the notice, the user can transmit the cancel instruction from the PC 200 to the printer 100. Accordingly, the confidentiality of the printing data is increased.

That is, in the first embodiment described above, even if the password issuance instruction is inputted by the third party, in a case that the third party does not have the mobile device by which the password is received, the third party never knows the password. Thus, the printing of the printing data can not be started by the third party. However, in the event that the third party has the mobile device, there is fear that the password is leaked and the printing is started. In view of this, in the second embodiment, the cancel instruction is allowed to be transmitted from the PC 200 which is an originating device of the printing data. By doing so, even if the third party has the mobile device and can obtain the password, it can be expected to avoid that the printing data is printed completely.

Third Embodiment

[Structure of Printing System]

Subsequently, an explanation will be made with reference to FIG. 10 about another embodiment of the operation of the printing system. In a printing system 910 of the third embodiment, the password issuance instruction is inputted from the mobile device 400 to the printer 100 via wireless communication. In this regard, the third embodiment is different from the first embodiment in which the password issuance instruction is inputted by the input operation of the user through the operation panel 40 of the printer 100.

Figure 10:
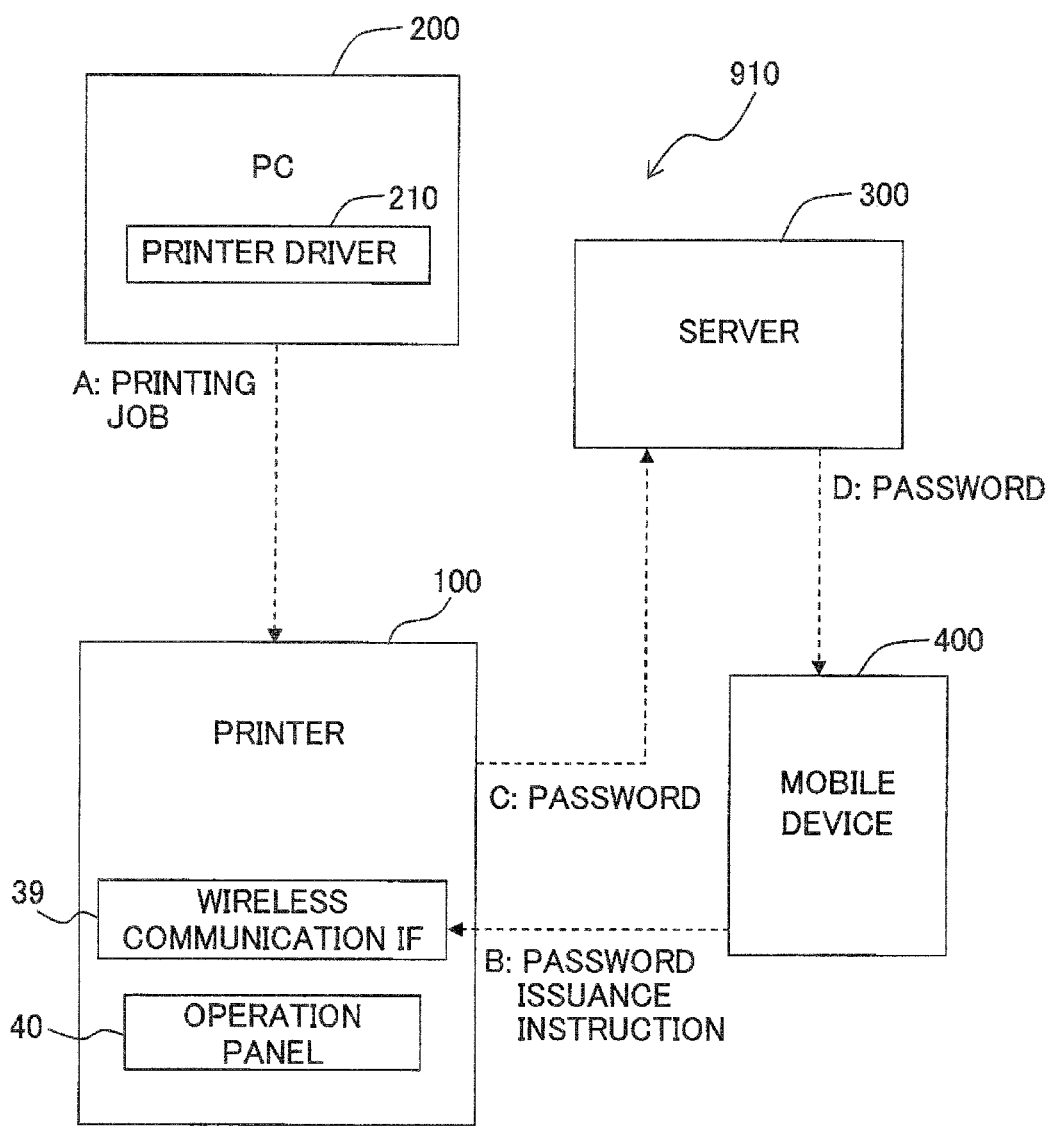
FIG. 10 is a block diagram schematically showing operation of a printing system according to the third embodiment.

In the printing system 910 of the third embodiment, at first, the printing job is entered from the PC 200 to the printer 100 (see "A: printing job" of FIG. 10). Then, the password issuance instruction for a specific printing job stored in the printer 100 is inputted by remote operation from the mobile device 400 to which the password of the printing job is transmitted (see "B: password issuance instruction" of FIG. 10). A publicly known wireless communication technique, such as the infrared ray communication or the wireless LAN, can be used in the input of the password issuance instruction from the mobile device 400 to the printer 100.

The printing job may be selected as follows. That is, for example, the mobile device 400 obtains a printing job list from the PC 100 and the user selects one from among the printing job list. Alternatively, by inputting the user ID from the mobile device 400, the printer 100 selects the printing job corresponding to the user ID automatically.

After the user entered the printing job to the printer 100, the user moves to a place at which the printer 100 is disposed while carrying the device by which the password issued from the printer 100 is received (for example, the mobile device 400). Then, the user operates the mobile device 400 near the printer 100 to input the password issuance instruction for the desired printing job.

In a case that the printer 100 accepts the password issuance instruction from the mobile device 400, the printer 100 creates the password for the printing job and transmits the password to the mobile device 400 (see "C: password" and "D: password" of FIG. 10).

In the third embodiment, the password issuance instruction can be inputted by the remote operation from the mobile device 400. Thus, it is possible for the user to input the password issuance instruction even at a place away from the printer 100. Therefore, there is a high risk of the leak of the password.

In view of this, in the third embodiment, the following condition is indispensable to issue the password. That is, the mobile device 400 is located within the predetermined range from the printer 100 at the process to judge the issuance condition (S103) in the password issuance process (see FIG. 3). In a case that the mobile device 400 is located within the predetermined range from the printer 100, the CPU 31 permits the issuance of the password. In a case that the mobile device 400 is not located within the predetermined range from the printer 100, the issuance of the password is not permitted. By doing so, it is possible to reduce the risk of the leak of the password. Further, similar to the first embodiment, it can be expected that the time after the password is obtained by the user and before the password is inputted by the user is shortened.

Thereafter, the mobile device 400 receives the password, and thereby the user knows the password corresponding to the printing job and inputs the password received by the mobile device 400 to the printer 100.

After transmitting the password, the printer 100 executes the print accepting process to accept the input of the password. After the input of the password by the user, the printer 100 checks the password inputted by the user against the password transmitted to the mobile device 400. Based on the condition that the password inputted by the user is coincident with the password transmitted to the mobile device 400, the printing of the printing job corresponding to the password is started.

In the explanation of the third embodiment, the device which performs the password issuance instruction and the device to which the password is transmitted are the same (that is, the mobile device 400). However, the device which performs the password issuance instruction may be different from the device to which the password is transmitted. For example, the device which performs the password issuance instruction may be a remote controller for the printer 100, and the device which receives the password may be the mobile device carried by each user. In this case, the CPU 31 judges in the judgment of the process S103 as to whether or not at least the device which performs the password issuance instruction is located within the predetermined range from the printer 100. In a case that the device which performs the password issuance instruction is not within the predetermined range, the CPU 31 prohibits the issuance of the password.

Fourth Embodiment

[Structure of Printing System]

Subsequently, an explanation will be made with reference to FIG. 11 about still another embodiment of the operation of the printing system. In a printing system 920 of the fourth embodiment, the printer 100 outputs a transmission instruction of the password to the server 300, and the server 300 generates the password. In this regard, the fourth embodiment is different from the first embodiment in which the printer 100 generates the password.

In the printing system 920 of the fourth embodiment, at first, the printing job is entered from the PC 200 to the printer 100 (see "A: printing job" of FIG. 11). Then, similar to the first embodiment, after the printing job of the password issuance objective is selected by the user, the password issuance instruction for the selected printing job is inputted by pressing the password issuance button 41 (see "B: password issuance instruction" of FIG. 11). It is noted that, like the third embodiment, the password issuance instruction may be inputted by the remote operation from the mobile device 400.

When the printer 100 accepts that the password issuance button 41 is pressed, the printer 100 requests the server 300 to generate the password for the printing job. In this embodiment, the printer 100 transmits, to the server 300, the transmission instruction to instruct generation of the password and transmission of said password ("C: transmission instruction" of FIG. 11).

In a case that the server 300 accepts the transmission instruction from the printer 100, the server 300 generates the password of the printing job which is correlated with the transmission instruction. Then, the server 300 obtains the destination of the password correlated with the user of the printing job and transmits the password to the mobile device 400 and the printer 100 (see "D: password" and "E: password" of FIG. 11). Noted that the server 300 may pick up the destination. Alternatively, the printer 100 may pick up the destination to add the destination to the transmission instruction.

Figure 3:
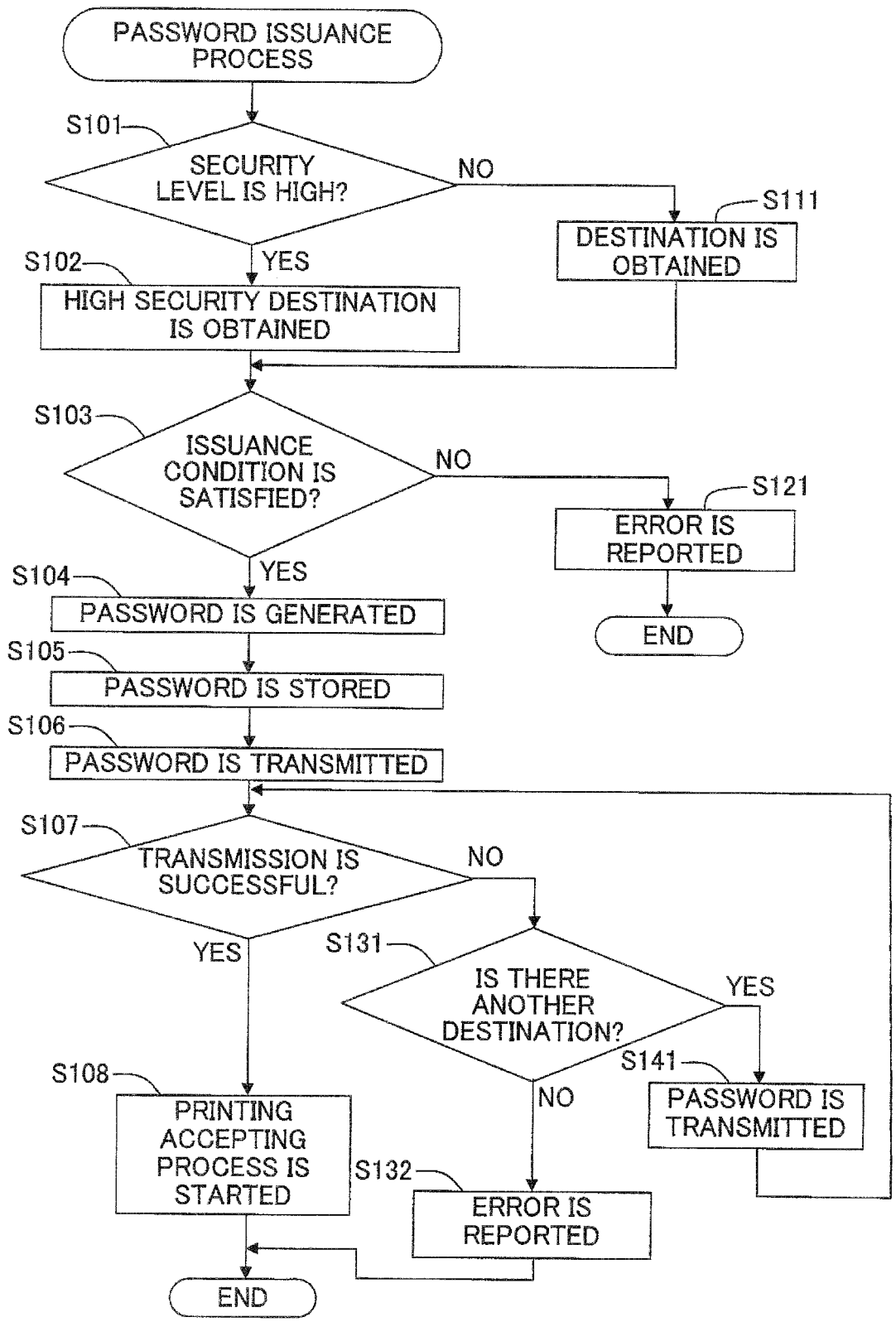
FIG. 3 is a flowchart showing a procedure of a password issuance process according to the first embodiment.

That is, the server 300 of this embodiment executes at least the processes S104 to S107 in the password issuance process (see FIG. 3). Accordingly, in this embodiment, the server 300 performs a part of the processes performed by the printer 100 in the first embodiment. Thus, it is possible to reduce a load of the printer 100. As a result, the printing system of this embodiment can be realized even in the printer which does not have a high performance.

Before transmitting the password, the server 300 may perform the judgment of the issuance condition (S103) performed in the password issuance process. In a case that the issuance condition is not satisfied, the issuance of the password may be prohibited. Further, the transmission instruction may be outputted in a case that after the printer 100 performs the judgment of the issuance condition (S103) in the password issuance process and further that the issuance condition is satisfied.

After the printer 100 receives the password from the server 300, the printer 100 executes the print accepting process to accept the input of the password. After the input of the password by the user, the printer 100 checks the password inputted by the user against the password received by the printer 100. Based on the condition that the password inputted by the user is coincident with the password received by the printer 100, the printing of the printing job corresponding to the password is started.

As described in detail above, in the printer and the printing system of the first to the fourth embodiments, the password of the printing data is transmitted to the destination (for example, the mobile device of the user having the printing data) which corresponds to the printing data, on the condition that the user operates the operation panel 40 or on the condition that the issuance instruction is inputted from the external device which is located within the predetermined range from the printer. Accordingly, the password is issued when the user is in the vicinity of the printer 100, and it can be expected to shorten the time after the password is obtained by the user and before the password is inputted by the user. Therefore, the password is less likely to be leaked to the third party.

The embodiments described above are merely examples to which the present teaching is applied, and the present teaching is not restricted to the embodiments described above. Therefore, it is needless to say that various modifications which fall within the basic teaching herein set forth may be made to the present teaching. For example, the printer may be any apparatus or device provided at least with a printing function, and the present teaching is applicable to multifunction machines and copy machines. Further, the information process apparatus through which the printing job is entered into the printer is not limited to the personal computer. For example, the information process apparatus may be mobile terminals such as the smartphone.

In the embodiments, the printing job is directly transmitted to the printer 100 from the PC 200. However, the present teaching is not limited thereto. For example, the printing job may be transmitted to the printer 100 from the PC 200 via the server 300.

In the embodiments, the password is transmitted to the mobile device 400 by the e-mail transmission via the server 300. However, the present teaching is not limited thereto. For example, in a case that the printer 100 is capable of transferring the data directly to and from the mobile device 400 and that the printer 100 is capable of identifying individual destination devices, the password may be transmitted to the mobile device 400 directly.

In the embodiments, the password issuance button 41 is displayed on the touch panel display on the condition that the printing job is selected. However, the password issuance button 41 may be displayed on the touch panel display from the beginning. Alternatively, other than the touch panel display, a dedicated button to issue the password may be provided in the operation panel 40. In these embodiments, in a case that the button is pressed in a state that the printing job is not selected, the input of the password may be regarded as invalid or the password issuance instructions for all of the stored printing jobs.

In the embodiments, the printer 100 has the destination database 341 in which the destination information is stored. However, the server 300 may have the destination database 341. In this case, the printer 100 inquires of the server 300 to obtain the destination information. Further, the destination information may be added to the printing job. In this case, the transmission of the password in accordance with the user's request can be performed by giving priority to the destination which is added to the printing job over the destination which is stored in the destination database 341.

In the embodiments, the printer 100 has the condition database 342 in which the issuance condition is stored. However, the server 300 may have the condition database 342. In this case, the printer 100 inquires of the server 300 to obtain the issuance condition. Further, the issuance condition may be added to the printing job. In this case, the transmission of the password in accordance with the user's request can be performed by giving priority to the issuance condition which is added to the printing job over the issuance condition which is stored in the condition database 342.

In the embodiments, in a case that the security level of the printing job is high, the number of transmissions in the first transmission (transmission to the first destination) is decreased. However, the present teaching is not limited thereto. For example, in the case that the security level of the printing job is high, the number of transmissions may be decreased by prohibiting the second transmission (transmission to the second destination).

What is claimed is:

1. A printing apparatus which performs printing on a medium based on printing data, the apparatus comprising:
    a storage section configured to store printing data and a table including a plurality of records, wherein each record includes an address and a security level information of the address;
    an accepting section configured to accept an issuance instruction to issue a password corresponding to the printing data;
    a confidentiality judgment section configured to judge as to whether confidentiality of the printing data is high or low;
    an obtaining section configured to obtain addresses from the table in the storage section, the obtaining section obtaining addresses of which security level information is high and low from the table in the storage section in response to the confidentiality judgment section judging the confidentiality of the printing data is low, and the obtaining section obtaining addresses of which security level information is high and not obtaining addresses of which the security level is low from the table in the storage section in response to the confidentiality judgment section judging the confidentiality of the printing data is high;
    a password generating section configured to generate a password in response to the accepting section accepting the issuance instruction;
    a transmission section configured to transmit the password generated by the password generating section to one of the addresses obtained by the obtaining section;
    an input section configured to accept an input of a password by a user;
    a judgment section configured to judge as to whether or not a password accepted by the input section is coincident with a transmitted password transmitted by the transmission section; and
    a printing section configured to start printing based on the printing data corresponding to the transmitted password, in response to the judgment section judging that the password accepted by the input section is coincident with the transmitted password;
    wherein after transmitting the generated password to the one of the obtained addresses, the transmission section determines whether transmitting the generated password to the one of the obtained addresses is unsuccessful;
    wherein the transmission section transmits the generated password to another one of the obtained addresses in response to the transmission section determining that transmitting the generated password to the one of the obtained addresses is unsuccessful.

2. The printing apparatus according to claim 1, further comprising an operation section configured to accept an input operation by the user,
    wherein the accepting section accepts the issuance instruction by the input operation to the operation section.

3. The printing apparatus according to claim 1, further comprising a confidentiality judgment section configured to judge as to whether or not confidentiality of the printing data is high,
    wherein in a case that the confidentiality judgment section judges that the confidentiality of the printing data is high, the password generated by the password generating section is transmitted to the at least one of the destinations, the number of which is smaller as compared with a case in which the confidentiality judgment section judges that the confidentiality of the printing data is not high.

4. The printing apparatus according to claim 1, wherein the accepting section accepts the issuance instruction by an output from an external device; and
    the printing apparatus further includes a prohibition section configured to judge as to whether or not the external device is located within a predetermined range from the printing apparatus and configured to prohibit at least one of the generation of the password by the password generating section and the transmission of the password by the transmission section, in a case that the prohibition section judges that the external device is not located within the predetermined range.

5. The printing apparatus according to claim 2, further comprising:
    a position judgment section configured to judge as to whether or not a communication device as the destination is located within a predetermined range from the printing apparatus; and
    a first transmission prohibition section configured to prohibit the transmission of the password by the transmission section in a case that the position judgment section judges that the communication device is not located within the predetermined range.

6. The printing apparatus according to claim 2, further comprising:
   a determining section configured to determine a period of time in which the transmission of the password by the transmission section is permitted; and
   a second transmission prohibition section configured to prohibit the transmission of the password by the transmission section outside the period of time determined by the determining section.

7. The printing apparatus according to claim 2, further comprising:
   a time judgment section configured to judge as to whether or not an elapsed time after the password is transmitted by the transmission section is not less than a predetermined time; and
   a first print prohibition section configured to prohibit the printing of the printing data corresponding to the password by the printing section, in a case that the time judgment section judges that the elapsed time is not less than the predetermined time.

8. The printing apparatus according to claim 2, further comprising a notifying section configured to send a notice of the transmission of the password to an address corresponding to an originating device by which the printing data corresponding to the password is stored in the storage section, in a case that the password is transmitted by the transmission section.

9. The printing apparatus according to claim 8, further comprising:
   an instruction accepting section configured to accept an instruction from the originating device as to whether or not the printing of the printing data corresponding to the password transmitted by the transmission section is permitted, after the notice is sent to the address corresponding to the originating device by the notifying section; and
   a second print prohibition section configured to prohibit the printing of the printing data by the printing section, in a case that the instruction accepting section accepts an instruction that the printing is not permitted.

10. The printing apparatus according to claim 2, further comprising an expansion section configured to start expansion of the printing data corresponding to the transmitted password, on condition of the transmission of the password by the transmission section.

11. A printing system which performs printing on a medium based on printing data, the system comprising:
   a printing apparatus which includes:
      a storage section configured to store printing data and a table including a plurality of records, wherein each record includes an address and a security level information of the address;
      an operation section configured to accept an input operation by a user; and
      an accepting section configured to accept an issuance instruction to issue a password corresponding to the printing data by the input operation to the operation section of the printing apparatus;
   a confidentiality judgment section configured to judge as to whether confidentiality of the printing data is high or low;
   an obtaining section configured to obtain addresses from the table in the storage section, the obtaining section obtaining addresses of which security level information is high and low from the table in the storage section in response to the confidentiality judgment section judging the confidentiality of the printing data is low, and the obtaining section obtaining addresses of which security level information is high and not obtaining addresses of which the security level is low from the table in the storage section in response to the confidentiality judgment section judging the confidentiality of the printing data is high;
   a password generating section configured to generate a password in response to the accepting section accepting the issuance instruction;
   a transmission section configured to transmit the password generated by the password generating section to one of the addresses obtained by the obtaining;
   wherein after transmitting the generated password to the one of the obtained addresses, the transmission section determines whether transmitting the generated password to the one of the obtained addresses is unsuccessful;
   wherein the transmission section transmits the generated password to another one of the obtained addresses in response to the transmission section determining that transmitting the generated password to the one of the obtained addresses is unsuccessful.

12. A printing apparatus comprising:
   an image forming section configured to form an image on the medium based on printing data;
   a storage section configured to store the printing data and a table including a plurality of records, wherein each record includes an address and a security level information of the address;
   an interface section configured to communicate with external devices;
   an operation section configured to accept an instruction input by a user;
   a controller configured to control the image forming section, the storage section, the interface section and the operation section, and configured to:
      receive an issuance instruction to issue a password corresponding to the print data via the operation section;
      judge whether a security level of the printing data is high or low;
      obtain addresses of which security level information is high and low from the table in the storage section in response to the security level of the printing data being judged to be low is low, and obtain addresses of which security level information is high and not obtaining addresses of which the security level is low from the table in the storage section in response to the security level of the printing data being judged to be high;
      generate a password in response to receiving the issuance instruction;
      transmit the generated password to one of the obtained addresses through the interface section;
      after transmitting the generated password to the one of the obtained addresses, determine whether transmitting the generated password to one of the obtained addresses is unsuccessful;
      transmit the generated password to another one of the obtained addresses through the interface section in response to the transmission of the generated password to the one of the obtained addresses is determined to be unsuccessful;
      in response to the operation section receiving an input of a password after transmitting the generated password to any one of the obtained addresses, judge whether or not the password accepted via the operation section is coincident with the transmitted password; and in response to the controller judging that the operation section accepts a password and the password accepted by the operation section is coincident with the transmitted password, start printing based on the received printing data stored in the storage section.

13. A printing apparatus comprising:
an image forming section configured to form an image on the medium based on a printing data;
a storage section configured to store
a printing data and
a table including: a plurality of records, wherein each record includes address and security information;
an interface section;
an operation section configured to accept an instruction input by a user; and
a controller configured to control the image forming section, the storage section, the interface section and the operation section, to:
receive a printing data from an originating device via the interface section;
store the received printing data in the storage section;
judge whether the security level of the printing data is high or low;
obtain, from the table in the storage section, address included in a record of which the security level information is high in response to the security level of the printing data is judged to be high;
obtain, from the table in the storage section, address included in a record of which the security level information is both high and low in response to the security level of the printing data is judged to be low;
generate a password;
transmit the generated password to one of the obtained address through the interface section;
after transmitting the generated password to the one of the obtained address, send, to the to the originating device through the interface section, a notice for notifying that the password is transmitted to the obtained address; and
start printing based on the received printing data stored in the storage section in response to the controller judging that the operation section accepts a password and the password accepted by the operation section is coincident with the transmitted password.

\* \* \* \* \*

UNITED STATES PATENT AND TRADEMARK OFFICE
CERTIFICATE OF CORRECTION

| | | |
|---|---|---|
| PATENT NO. | : 9,235,718 B2 | Page 1 of 1 |
| APPLICATION NO. | : 13/454613 | |
| DATED | : January 12, 2016 | |
| INVENTOR(S) | : Masataka Suzuki | |

It is certified that error appears in the above-identified patent and that said Letters Patent is hereby corrected as shown below:

In the Claims

It Should Read:

Column 20, line 13 (claim 13): obtained address, send, to the originating device Signed and Sealed this
Twenty-sixth Day of July, 2016

Michelle K. Lee
*Director of the United States Patent and Trademark Office*